(12) United States Patent
Brochu et al.

(10) Patent No.: US 10,085,330 B2
(45) Date of Patent: *Sep. 25, 2018

(54) LIGHT BULB, INTELLIGENT LIGHTING DEVICE AND METHOD AND SYSTEM FOR USE IN CONFIGURING SAME

(71) Applicant: GECKO ALLIANCE GROUP INC., Quebec (CA)

(72) Inventors: Christian Brochu, Quebec (CA); Benoit Laflamme, Quebec (CA)

(73) Assignee: GECKO ALLIANCE GROUP INC., Quebec, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,955

(22) Filed: Jun. 2, 2017

(65) Prior Publication Data

US 2017/0273166 A1 Sep. 21, 2017

Related U.S. Application Data

(63) Continuation of application No. 15/228,183, filed on Aug. 4, 2016, now Pat. No. 9,713,235, which is a
(Continued)

(51) Int. Cl.
*H05B 37/02* (2006.01)
*H05B 33/08* (2006.01)
(Continued)

(52) U.S. Cl.
CPC .......... *H05B 37/0272* (2013.01); *F21V 3/02* (2013.01); *G05B 19/042* (2013.01);
(Continued)

(58) Field of Classification Search
CPC . H05B 37/0272; H05B 37/0281; H05B 37/02
(Continued)

(56) References Cited

U.S. PATENT DOCUMENTS 4,237,562 A 12/1980 DuPont
5,457,826 A 10/1995 Haraga et al.
(Continued)

FOREIGN PATENT DOCUMENTS

CA 2430862 11/2007
CA 2324598 5/2008
(Continued)

OTHER PUBLICATIONS

Examiner's Report dated Sep. 29, 2016 in connection with Canadian Patent Application No. 2,852,445.
(Continued)

*Primary Examiner* — Daniel D Chang

(57) ABSTRACT

An intelligent light bulb is provided as well as a method, devices and computer program product of configuring such an intelligent light bulb. The intelligent light bulb comprises an LED lighting element and a programmable controller. The programmable controller comprises a memory module having stored therein firmware including instructions for controlling operations of the LED lighting element, where the memory module including a passive memory on which at least a portion of the firmware is stored. The passive memory component of the memory module is responsive to a signal carrying firmware update information received over a wireless communication link from a device external to the intelligent light bulb for causing a firmware update process to be performed to modify the instructions of the firmware based on the update information carried by the signal. The programmable controller also includes a processing unit in communication with the memory module for operating the LED lighting element at least in part in accordance with the instructions of the firmware. Advantageously, the proposed intelligent light bulb can be configured using the signal carrying the firmware update information. In some embodiments, this may allow modifications of certain operating
(Continued)

characteristic of the intelligent light bulb to be performed after manufacturing, including modifications pertaining to light color emitted and/or manner of operating the light bulb.

27 Claims, 6 Drawing Sheets

Related U.S. Application Data continuation of application No. 14/717,465, filed on May 20, 2015, now Pat. No. 9,445,482, which is a continuation-in-part of application No. 14/286,788, filed on May 23, 2014, now Pat. No. 9,641,959.

(51) Int. Cl.
G05B 19/12 (2006.01)
F21V 3/02 (2006.01)
G06F 8/65 (2018.01)
G06K 7/10 (2006.01)
G05B 19/042 (2006.01)
F21Y 115/10 (2016.01)

(52) U.S. Cl.
CPC ............. *G05B 19/124* (2013.01); *G06F 8/65* (2013.01); *G06K 7/10861* (2013.01); *H05B 33/08* (2013.01); *H05B 33/0803* (2013.01); *H05B 33/0845* (2013.01); *H05B 33/0857* (2013.01); *H05B 37/02* (2013.01); *F21Y 2115/10* (2016.08); *G05B 2219/25112* (2013.01); *Y02B 20/342* (2013.01); *Y02B 20/343* (2013.01); *Y02B 20/383* (2013.01); *Y02B 20/48* (2013.01)

(58) Field of Classification Search
USPC ........................................ 315/294, 131, 297
See application file for complete search history.

(56) References Cited

U.S. PATENT DOCUMENTS

| | | | |
|---|---|---|---|
| 5,710,409 A | 1/1998 | Schwarzbacker et al. |
| 5,772,963 A | 6/1998 | Cantatore et al. |
| 5,930,852 A | 8/1999 | Gravat et al. |
| 5,988,857 A | 11/1999 | Ozawa et al. |
| 6,200,108 B1 | 3/2001 | Caudill et al. |
| 6,282,370 B1 | 8/2001 | Cline et al. |
| 6,355,913 B1 | 3/2002 | Authier et al. |
| 6,444,171 B1 | 9/2002 | Sakazume et al. |
| 6,476,363 B1 | 11/2002 | Authier et al. |
| 6,487,717 B1 | 11/2002 | Brunemann et al. |
| 6,488,408 B1 | 12/2002 | Laflamme et al. |
| 6,717,050 B2 | 4/2004 | Laflamme et al. |
| 6,744,223 B2 | 6/2004 | Laflamme et al. |
| 6,780,617 B2 | 8/2004 | Chen |
| 6,782,309 B2 | 8/2004 | Laflamme et al. |
| 6,813,575 B2 | 11/2004 | Laflamme |
| 6,874,175 B2 | 4/2005 | Laflamme et al. |
| 6,900,736 B2 | 5/2005 | Crumb |
| 6,929,516 B2 | 8/2005 | Brochu et al. |
| 6,942,354 B2 | 9/2005 | Metayer et al. |
| 6,976,052 B2 | 12/2005 | Tompkins et al. |
| 7,112,768 B2 | 9/2006 | Brochu et al. |
| 7,327,275 B2 | 2/2008 | Brochu et al. |
| 7,419,406 B2 | 9/2008 | Brochu et al. |
| 7,440,829 B2 | 10/2008 | Hara |
| 7,489,986 B1 | 2/2009 | Laflamme et al. |
| 7,593,789 B2 | 9/2009 | Gougerot et al. |
| 7,619,181 B2 | 11/2009 | Authier |
| 7,664,845 B2 | 2/2010 | Kurtz et al. |
| 7,701,679 B2 | 4/2010 | Brochu et al. |
| 7,788,669 B2 | 8/2010 | England et al. |
| 7,843,357 B2 | 11/2010 | Brochu et al. |
| 7,982,625 B2 | 7/2011 | Brochu et al. |
| 8,104,110 B2 | 1/2012 | Caudill et al. |
| 8,150,552 B2 | 4/2012 | Brochu et al. |
| 8,164,470 B2 | 4/2012 | Brochu et al. |
| 9,078,802 B2 | 7/2015 | Brochu et al. |
| 9,385,784 B2 | 7/2016 | Kim |
| 9,445,482 B2 | 9/2016 | Brochu et al. |
| 9,565,744 B2 | 2/2017 | Lai et al. |
| 9,641,959 B2 | 5/2017 | Brochu et al. |
| 9,713,235 B2 | 7/2017 | Brochu et al. |
| 9,854,651 B2 | 12/2017 | Lai et al. |
| 2002/0035403 A1 | 3/2002 | Clark et al. |
| 2004/0204779 A1 | 10/2004 | Mueller et al. |
| 2004/0230794 A1 | 11/2004 | England et al. |
| 2005/0040250 A1 | 2/2005 | Wruck |
| 2005/0063123 A1 | 3/2005 | Cline et al. |
| 2005/0168902 A1 | 8/2005 | Laflamme et al. |
| 2005/0228544 A1 | 10/2005 | Bauer et al. |
| 2005/0240919 A1 | 10/2005 | Kim et al. |
| 2006/0277330 A1 | 12/2006 | Diepstraten et al. |
| 2007/0106403 A1 | 5/2007 | Emery et al. |
| 2008/0003114 A1 | 1/2008 | Levin et al. |
| 2009/0011417 A1 | 1/2009 | Maltezos et al. |
| 2009/0118871 A1 | 5/2009 | Debourke et al. |
| 2011/0046796 A1 | 2/2011 | Brochu et al. |
| 2011/0093099 A1 | 4/2011 | Tran et al. |
| 2012/0178367 A1 | 7/2012 | Matsumoto et al. |
| 2012/0329393 A1 | 12/2012 | Hillan et al. |
| 2013/0005247 A1 | 1/2013 | Awad et al. |
| 2013/0102247 A1 | 4/2013 | Hillan et al. |
| 2013/0293112 A1* | 11/2013 | Reed ................. H05B 37/0272 315/131 |
| 2014/0132210 A1 | 5/2014 | Partovi |
| 2014/0167978 A1 | 6/2014 | Popa |
| 2014/0213177 A1 | 7/2014 | Terwilliger |
| 2015/0061541 A1 | 3/2015 | Gandini |
| 2015/0188609 A1 | 7/2015 | Inoue et al. |
| 2015/0341969 A1 | 11/2015 | Brochu et al. |
| 2015/0342011 A1 | 11/2015 | Brochu et al. |

FOREIGN PATENT DOCUMENTS

| | | |
|---|---|---|
| CA | 2483876 | 7/2009 |
| CA | 2349106 | 10/2009 |
| CA | 2442861 | 12/2009 |
| CA | 2521572 | 12/2009 |
| CA | 2361096 | 3/2011 |
| CA | 2467015 | 7/2011 |
| CA | 2492350 | 11/2011 |
| CA | 2357641 | 1/2012 |
| CA | 2412221 | 1/2012 |
| CA | 2499551 | 5/2012 |
| CA | 2678016 | 1/2014 |
| EP | 1588685 | 10/2005 |
| EP | 1653366 | 5/2006 |
| WO | WO2006/133204 | 12/2006 |
| WO | WO2012178107 | 12/2012 |
| WO | WO2013/049651 | 4/2013 |
| WO | WO2015/025267 | 2/2015 |

OTHER PUBLICATIONS

Hanabusa, Russel, "Comparing JTAG, SPI, and I2C.", Application Note, Spansion, Revision 01, issued on Apr. 13, 2007, 7 pages.
Office action dated Sep. 7, 2011, in connection with U.S. Appl. No. 12/528,256, 10 pages.
Examiner's Report dated Feb. 22, 2012, in connection with Canadian Patent Application 2,678,016, 3 pages.
Notice of Allowance dated Dec. 20, 2011, in connection with U.S. Appl. No. 12/528,256, 15 pages.
Examiner's Report dated Oct. 10, 2012 in connection with Canadian Patent Application Serial No. 2,678,016, 2 pages.
Office Action dated Oct. 22, 2014 in connection with U.S. Appl. No. 13/359,843, 20 pages.
Notice of Allowance dated Mar. 11, 2015 in connection with U.S. Appl. No. 13/359,843, 5 pages.

(56) References Cited

OTHER PUBLICATIONS

Office action dated Sep. 22, 2015 in connection with U.S. Appl. No. 14/286,788.
Examiner's Report dated Nov. 30, 2015 in connection with Canadian Patent Application No. 2,852,445.
Office action dated Dec. 3, 2015 in connection with U.S. Appl. No. 14/717,465.
Final Office Action dated Feb. 22, 2016 in connection with U.S. Appl. No. 14/286,788—78 pages.
Notice of Allowance dated May 25, 2016 in connection with U.S. Appl. No. 14/717,465.
Examiner's Report dated Jun. 7, 2016 in connection with Canadian Patent Application 2,892,464—5 pages.
Office Action dated Jul. 18, 2016 in connection with U.S. Appl. No. 14/286,788—81 pages.
Examiner's Report dated Dec. 9, 2016 in connection with Canadian Patent Application 2,892,464—4 pages.
Non-Final Action dated Dec. 23, 2016 in connection with U.S. Appl. No. 15/228,183—6pages.
Notice of Allowance dated Dec. 22, 2016 in connection with U.S. Appl. No. 14/286,788—3 pages.
International Preliminary Report on Patentability dated Aug. 26, 2009 in connection with International Patent Application Serial No. PCT/CA2008/000352, 7 pages.
International Search Report dated Jun. 6, 2008, in connection with International Patent Application PCT/CA2008/000352, 4 pages.
Written Opinion of the International Searching Authority dated Jun. 6, 2008, in connection with International Patent Application PCT/CA2008/000352, 6 pages.
Extended European Search Report dated Nov. 28, 2011 in connection with European Patent Application No. 08 714 674.2, 7 pages.
Notice of Allowance dated Mar. 17, 2017 in connection with U.S. Appl. No. 15/228,183—3 pages.
Examiner's Report dated Dec. 28, 2017 in connection with related Canadian Patent Application No. 2,892,464—6 pages.
U.S. Appl. No. 61/867,326, filed Aug. 19, 2013.

\* cited by examiner

LIGHT BULB, INTELLIGENT LIGHTING DEVICE AND METHOD AND SYSTEM FOR USE IN CONFIGURING SAME

CROSS-REFERENCE TO RELATED APPLICATION

This application is a continuation claiming the benefit of priority under 35 USC § 120 based on co-pending U.S. patent application Ser. No. 15/228,183 filed Aug. 4, 2016, which itself was a continuation claiming the benefit of priority under 35 USC § 120 based on U.S. patent application Ser. No. 14/717,465, which was filed on May 20, 2015, which itself was a continuation in part claiming the benefit of priority under 35 USC § 120 based on U.S. patent application Ser. No. 14/286,788, which was filed on May 23, 2014 and which is presently pending. The contents of the above-noted applications are incorporated herein by reference.

FIELD OF THE INVENTION

The present invention relates generally to the field of light bulbs, and more particularly to a method, device and system for configuring and updating firmware in such light bulbs to control light intensity and color emitted by such devices.

BACKGROUND

Electronic controllers are commonly used to control the functioning of intelligent light bulb and lighting devices amongst many others.

A same hardware platform can be used in a controller for different variations/models of an intelligent light bulb and lighting devices, where the variations/models may be perceptible for example in terms of the features provided by the device and/or color of the light emitted by the device. Adapting a hardware platform of an electronic controller to different variations/models of a device sometimes merely amounts to installing different associated software options in a programmable memory of the hardware platform. Such a process is typically referred to as programming or loading the firmware of the controller. Using a same hardware platform for different variations/models of a device may present advantages in terms of design and production costs since that same hardware platform can be built and used in connection with multiple end devices/systems.

The installation of software options on a hardware platform of an electronic controller is typically performed by the device manufacturer on an assembly line.

A deficiency associated with many conventional methods for installing such software options is that they typically require that the electronic controllers, or portions thereof, be activated (for example by plugging them into an external source of electrical power) prior to and during the installation of the software options. This requirement implies a level of complexity for the assembly line since the latter must be configured with power outlets and connectors for supplying power to the electronic controllers. It also requires that the electronic controllers be physically connected to such power outlets and connectors, by people or machines for example. This in turn adds to the manufacturing cost of the device.

A related deficiency associated with conventional methods for installing software options on electronic controllers of the type presented above is that, once an electronic controller is packaged for shipment, there are no easy techniques for allowing the electronic controller to be configured (or reconfigured) without removing the electronic controller from the packaging and without activating it. As such, the packaging of the electronic controller is often delayed to until after the software options have been installed.

Another deficiency associated with conventional methods for installing software options on electronic controllers of the type presented above is that, in order to update the firmware of the electronic controller, for example to add additional features and/or to correct a defect in the software currently loaded on the electronic controller, the controller must again be activated, which in some cases may not be desirable or even possible.

With respect to intelligent light bulbs, yet another challenge associated with conventional methods for updating firmware of electronic controllers integrated into such light bulbs is that there is no suitable way to access the processor inside the bulb to reprogram it and/or update it, for example to add additional features and/or to correct a defect in the software currently loaded in the light bulb and/or change the color of the light generated by the light bulb, once the light bulb is manufactured.

In the above cases, the process of configuring or updating the firmware of electronic controllers is either not available or is inconvenient, cumbersome and/or expensive.

In light of the above, it can be seen that there is a need in the industry for a method, system and device that is able to alleviate, at least in part, the deficiencies associated with the traditional methods of configuring the firmware of electronic controllers.

SUMMARY

In accordance with a first aspect, an intelligent light bulb is provided. The intelligent light bulb comprises an LED lighting element and a programmable controller in communication with the LED lighting element. The programmable controller comprises:
i) a memory module having stored therein firmware including instructions for controlling operations of the LED lighting element, the memory module including a passive memory component on which at least a portion of the firmware is stored, the passive memory component of the memory module being configured to be responsive to a signal carrying firmware update information received over a wireless communication link from a device external to the intelligent light bulb for causing a firmware update process to be performed to modify the instructions of the firmware based on the update information carried by the signal; and
ii) a processing unit in communication with the memory module, the processing unit being programmed for operating the LED lighting element at least in part in accordance with the instructions of the firmware.

In some specific practical implementations, the passive memory component includes a near field communication memory (NFC memory).

In specific practical implementations, the passive memory component of the memory module is responsive to the signal carrying firmware update information received over the wireless communication link from the device external to the intelligent light bulb for:
(1) drawing energy from the signal to activate the passive memory component; and
(2) causing the firmware update process to be performed to modify the instructions of the firmware based on the update information carried by the signal, at least part of the firmware update process being performed while the passive memory component remains activated using energy drawn from the signal.

In accordance with a specific implementation, the passive memory component is configured to be responsive to the signal carrying firmware update information received from the external device for causing at least part of the firmware update process to be performed in the absence of electrical power being supplied to the programmable controller. In a specific practical implementation, at least part of the firmware update process is performed using the signal as the sole source of electrical energy.

In accordance with specific practical implementations, the firmware includes program code implementing a set of light bulb configurations including at least a first light bulb configuration and a light bulb second configuration. In such implementation, the firmware update information may convey an access code associated with a specific light bulb configuration from the set of light bulb configuration so that, following the performance of the firmware update process, the processing unit operates the intelligent light bulb in accordance with the specific light bulb configuration associated with the access code. In specific practical implementations, the processing unit may be programmed for selecting the specific configuration from the set of light bulb configurations at least in part by processing the access code to select a portion of the instructions stored on the firmware, where the selected portion of the instruction implements the specific light bulb configuration.

In specific implementations, the LED lighting element may comprise multiple LED light components characterized in that operating in specific manners specific subsets of the LED light components may allow respective distinct light colors to be generated by the light bulb. The instructions of the firmware may enable operating at least one specific subset of the LED light components in at least one specific manner. For example, operating in a specific manner a first subset of the LED light components may causes a first light color, or first color temperature, to be generated by the light bulb while operating in a specific manner a second subset of the LED light components may cause a second light color, or second color temperature, to be generated by the light bulb, where the first light color may be visually distinguishable from the second light color. In a non-limiting implementations, the first light color may be a first white light color associated with a first specific color temperature and the second light color may be a second white light color associated with a second specific color temperature or may be any other suitable light color.

In a specific implementation, the passive memory component is configured for communicating with the device external to the light bulb over a radio frequency (RF) communication link, such as for example a short range RF communication link, established between the passive memory component and the device external to the light bulb.

In a very specific practical implementation, the device external to the system from which the signal carrying firmware update information is received is embodied in an NFC enabled computing device. Advantageously, the use of an NFC memory on the controller allows the firmware update process to be performed in the absence of a source of electrical power to the controller using energy drawn from the signal transmitted by the NFC enabled computing device.

In accordance with another aspect, an auxiliary device suitable for configuring an intelligent light bulb is provided. The intelligent light bulb comprises an LED lighting element and a programmable controller for operating the LED lighting element, the programmable controller comprising a memory module having stored thereon firmware including instructions for controlling operations of the LED lighting element, the memory module including a passive memory component on which at least a portion of the firmware is stored, the programmable controller being programmed for operating the intelligent light bulb at least in part in accordance with the instructions stored on the memory module. The auxiliary device comprises:
  a) a communication interface suitable for communicating with the programmable controller of the intelligent light bulb over a wireless communication link;
  b) a processing unit in communication with the communication interface programmed for transmitting a signal over the wireless communication link to the intelligent light bulb carrying firmware update information associated with the intelligent light bulb, the signal being configured for:
    i) causing the passive memory component of the programmable controller to be activated by drawing energy from said signal; and
    ii) causing a firmware update process to be performed by the controller to modify the instructions of the firmware based on the update information. carried by the signal, at least part of said firmware update process being performed by the controller while the passive memory component remains activated using energy drawn from said signal.

In specific implementations, the wireless communication link may be a radio frequency (RF) communication link and the signal carrying the firmware update information. associated with the intelligent light bulb may be an RF signal. In practical implementations, the (RF) communication link is a short range RF communication link.

The auxiliary device may be embodied in an NFC enabled computing device, including for example a smartphone or tablet and the passive memory component including a near field communication memory (NFC memory).

In specific implementations, the firmware update information carried by the signal may include program code implementing a specific light bulb configuration associated with a specific variation of the intelligent light bulb. in such implementations, the firmware update process may cause the program code implementing the specific light bulb configuration to be stored on the firmware of the controller to enable the controller of the intelligent light bulb to operate the intelligent light bulb based on the specific light bulb configuration implemented by the program code. In a specific practical implementation, the LED lighting element may comprise multiple LED light components characterized in that operating in specific manners specific subsets of the LED light components may allow respective distinct light colors to be generated by the light bulb. In such an implementation, the specific light bulb configuration implemented by the firmware update information may be associated with at least one specific distinct subset of the LED light components so that the intelligent light bulb is caused to generate a corresponding specific light color when operated in a specific manner.

In specific alternate implementations, the firmware update information carried by the signal may store program code implementing a set of configurations including at least a first configuration and a second configuration. In such specific alternate implementations, the firmware update information carried by the signal may convey an access code associated with a specific one of the first configuration and the second configuration. The firmware update process may cause the access code to be stored on the passive memory component of the firmware to enable the controller to select the specific one of the first configuration and the second configuration to which the access code is associated and to operate the intelligent light bulb in accordance with the selected specific one of the first configuration and the second configuration.

In specific implementations, the firmware update information carried by the signal may include program code implementing a set of configurations including at least a first configuration and a second configuration.

In a first example in which the LED lighting element comprises multiple LED light components, the first configuration may he for enabling the controller of the intelligent light bulb to operate a first subset set of components of the LED light components and the second configuration may be for enabling the controller of the intelligent light bulb to operate a second subset of the LED light components.

In a second example, the first configuration may be for enabling the programmable controller to operate the intelligent light bulb in a first manner and the second configuration may be for enabling the controller to operate the intelligent light bulb to control in a second manner.

In accordance with another aspect, a method for configuring an intelligent light bulb is provided wherein the intelligent light bulb comprises an LED lighting element and a programmable controller for operating the LED lighting element. The programmable controller comprises memory module having stored thereon firmware including instructions for controlling operations of the LED lighting element, wherein the memory module includes a passive memory component on which at least a portion of the firmware is stored, and the programmable controller is programmed for operating the intelligent light bulb at least in part in accordance with the instructions stored on the memory module. The method comprises using an auxiliary device to obtaining firmware update information associated with the intelligent light bulb and using the auxiliary device to transmit a signal carrying the firmware update information to the intelligent light bulb over a wireless communication link. The signal is configured for causing a firmware update process to be performed to modify the instructions of the firmware based on the update information carried by the signal.

In specific implementations, the memory module is responsive to the signal carrying firmware update information received over the wireless communication link from the auxiliary device for drawing energy from the signal to activate the passive memory component and for causing the firmware update process to be performed to modify the instructions of the firmware based on the update information carried by the signal. At least part of the firmware update process may be performed while the passive memory component remains activated using energy drawn from the signal.

In specific implementations, the firmware update information carried by the signal may include program code implementing a specific light bulb configuration associated with a specific variation of the intelligent light bulb. For such implementations, the firmware update process may cause the program code implementing the specific light bulb configuration to be stored on the firmware of the controller to enable the controller of the intelligent light bulb to operate the intelligent light bulb based on the specific light bulb configuration implemented by the program code.

In accordance with another aspect, a manufacturing process for an intelligent light bulb is provided wherein the intelligent light bulb comprises an LED lighting element and a controller for operating the LED lighting element, the controller comprising firmware including a passive memory component and storing instructions for controlling operations of the LED lighting element. The controller is configurable for operating a specific one of a plurality of variations of the intelligent light bulb at least in part in dependence of instructions stored on the firmware, the manufacturing process implementing a method of the type describe above for configuring the intelligent light bulb.

In accordance with another aspect, a computer program product is provided, tangibly stored on one or more tangible computer readable storage media, for configuring an intelligent light bulb. The intelligent light bulb comprises an LED lighting element and a programmable controller for operating the LED lighting element, the programmable controller comprising firmware including a passive memory component including a near field communication memory (NFC memory) and storing instructions for controlling operations of the intelligent light bulb. The programmable controller is programmed for operating the intelligent light bulb at least in part in accordance with the instructions stored on the firmware. The program product comprises instructions that, when executed, cause a programmable device including at least one programmable processor to implement a method of the type describe above for configuring the intelligent light bulb.

In accordance with another aspect, an intelligent light bulb is provided. The intelligent light bulb comprises and a lighting element comprising multiple light components characterized in that operating in specific manners specific subsets of the light components allows respective distinct light colors to be generated by the light bulb. The intelligent light bulb also comprises a programmable controller in communication with the lighting element. The programmable controller comprises a memory module having stored thereon firmware including instructions for controlling operations of the lighting element, the memory module including a passive memory component on which at least a portion of the firmware is stored, the passive memory component of the memory module being configured to be responsive to a signal carrying firmware update information received over a wireless communication link from a device external to the intelligent light bulb for causing a firmware update process to be performed to modify the instructions of the firmware based on the update information carried by the signal. The programmable controller also comprises a processing unit in communication with the memory component, the processing unit being programmed for operating the lighting element at least in part in accordance with the instructions of the firmware. The instructions of the firmware enable the processing unit to control operations of specific subsets of the light components so that the intelligent light bulb is caused to generate a corresponding specific light color when operated in a specific manner.

In specific implementations, operating in specific manners specific subsets of the light components may allow for respective distinct white light colors to be generated by the light bulb including at least a first white light color associated with a first specific color temperature and a second white light color associated with a second specific color temperature. In non-limiting implementations, the white light colors may include light colors such as "warm white", "soft white" and "bright white" for example.

In accordance with another aspect, an intelligent light bulb is provided. The intelligent light bulb comprises and an LED lighting element and a programmable controller in communication with the LED lighting element. The programmable controller comprises a passive memory component including a near field communication memory (NFC memory). The passive memory component is responsive to a signal received over a wireless communication link from a device external to the intelligent light bulb for causing an update process to be performed to modify information stored on the passive memory component based on information carried by the signal. The programmable controller also comprises a processing unit in communication with the passive memory component programmed for operating the LED lighting element at least in part in accordance with instructions stored on the passive memory component.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
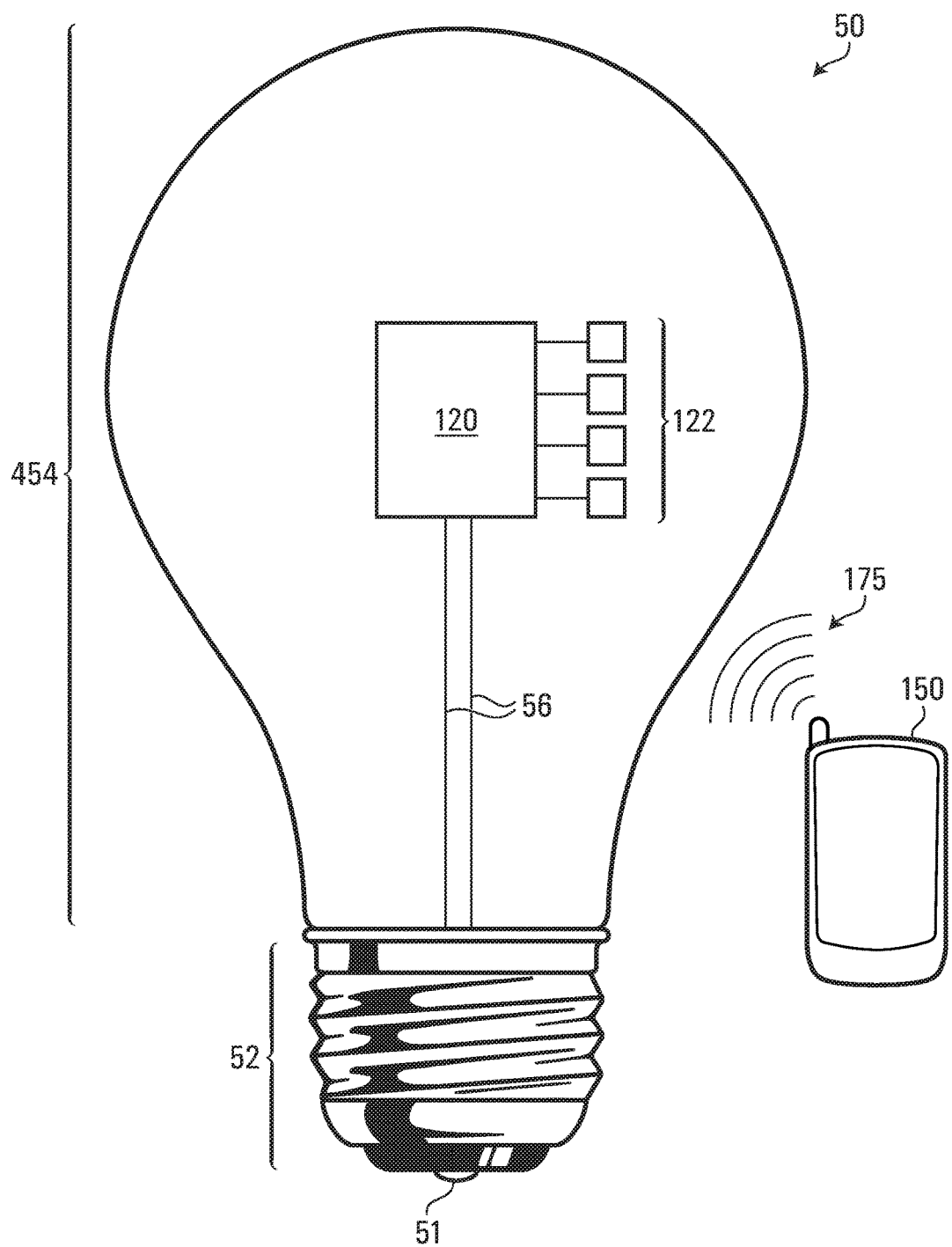
FIG. 1 shows a diagram of an intelligent light bulb and an auxiliary device for configuration the light bulb in accordance with a non-limiting example of implementation of the present invention.

FIG. 1 of the drawings shows an intelligent light bulb 50 in accordance with a non-limiting embodiment. In the specific example depicted, the intelligent light bulb 50 is embodied to resemble a conventional incandescent light bulb and, in this regard, includes an electrical contact 51 for establishing an electrical connect with a source of electrical power via a complementary socket (not shown), a screw cap 52 and a translucent envelop 454. The translucent envelop 454 may be made of glass or any other material suitable for such envelop, including plastic, and may be of any suitable shape.

It is to be appreciated that which the example depicted in the figures shows an intelligent light bulb 50 having resembling a conventional incandescent light bulb, other configurations are possible and will become apparent to the person skilled in the art in view of the present description. For example, while the coupling with an electrical socket has been shown as including the electrical contact 51 and a screw cap 52, other configurations may be used in which the screw cap 52 may be replaced by any other type of suitable connector for engaging the light bulb within a socket.

Within the translucent envelop 454 are found connecting wires 56 for providing electrical power to a programmable controller 120 and a lighting element 122. In the embodiment depicted the lighting element 122 is comprised of multiple LED light components. While the present document will describe embodiments in which the lighting element 122 makes of LED light components, it is to be understood that other light types may also be used in alternate implementations.

The programmable controller 120 comprises firmware including instructions for controlling operations of the lighting element 122. In a non-limiting implementation, the instructions stored on the firmware may control the color and/or intensity of the light that is generated by the intelligent light bulb 50. Alternatively, the instructions stored on the firmware may control the manner in which the intelligent light bulb 50 operates, for example by providing features such as dimming functionality and special lighting effects and/or lighting patterns for example.

The programmable controller 120 includes components responsive to a signal carrying firmware update information received over a wireless communication link 175 from an auxiliary device 150 external to the intelligent light bulb 50 for causing a firmware update process to be performed to modify the instructions of the firmware based on the update information carried by the signal. Once the instructions in the firmware modified, the programmable controller 120 operates the LED lighting element at least in part in accordance with the instructions of the firmware.

Figure 2:
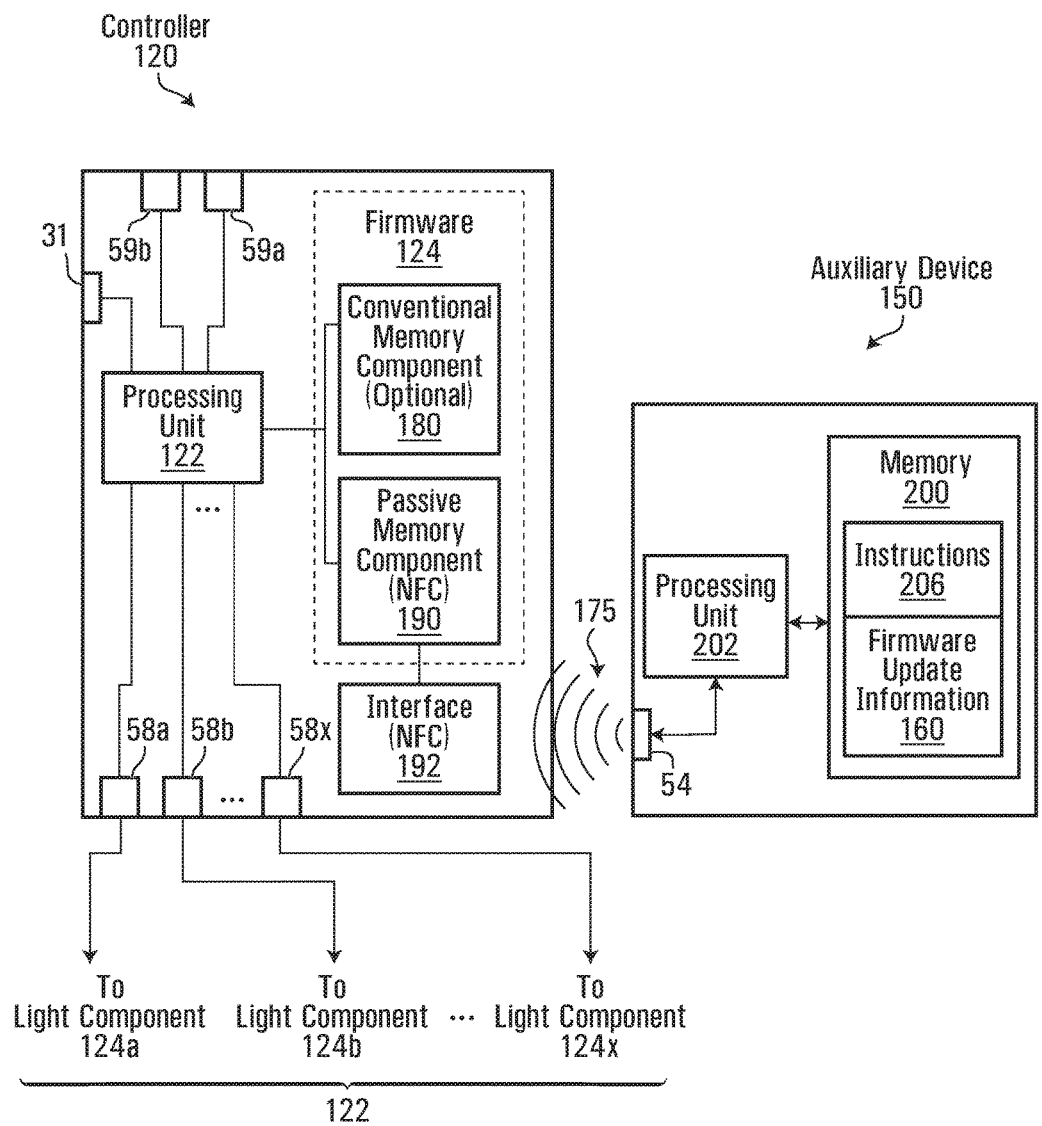
FIG. 2 shows a functional block diagram of a programmable controller part of the intelligent light bulb depicted in FIG. 1 and of the auxiliary device also depicted in FIG. 1 in accordance with a non-limiting example of implementation of the present invention.

FIG. 2 illustrates a block diagram of the programmable controller 120 and of the auxiliary device 150 used for configuring the intelligent light bulb 50 shown in FIG. 1 in accordance with a specific example of implementation of the present invention.

The auxiliary device 150 and the controller 120 of the intelligent light bulb 50 are configured to establish a communication link 175 therebetween for enabling the controller 120 to receive information from, and/or transmit information to, the auxiliary device 150 even in the absence of electrical power being supplied to the controller 120 by an external electrical power source. As will be described in more detail below, the concepts presented here may be used for example for one or more of the following:

1) to allow the auxiliary device 150 to provide firmware update information to the controller 120 even in the absence of electrical power being supplied to the controller 120 by an external electrical power source;

(2) to allow the controller 120 to provide diagnostic information associated with the operation of the intelligent light bulb 50 to the auxiliary device 150 even in the absence of electrical power being supplied to the controller 120 by an external electrical power source.

The description presented here focuses more particularly on the purpose identified in (1) above, namely allowing the auxiliary device 150 to provide firmware update information to the controller 120 even in the absence of electrical power being supplied to the controller 120 by an external electrical power source. However the person skilled in the art, in light of the present description, will readily appreciate how the auxiliary device 150 and the controller 120 may be modified in to achieve the purpose identified in (2).

Each of these components 120 and 150, as well examples of the manners in which they may interact, will now be described in greater detail.

Programmable Controller 120

As shown, the programmable controller 120 includes a hardware platform having firmware 124, including a passive memory component 190, and a processing unit 122 in communication with the firmware 124. In the embodiment described, the controller 120 is positioned within the translucent envelop 454 of the light bulb 50 (shown in FIG. 1) and is used for controlling the operation of the intelligent light bulb 50 and, in particular, the operation of the lighting element 122 of the intelligent light bulb 50.

The programmable controller 120 is equipped with the necessary circuitry and ports to allow it to receive, during operation, electrical power from any suitable external source electrical power (not shown in the figures). In the example depicted, the connection of programmable controller 120 to a suitable external source of electrical power is depicted as port 31, which connects to connecting wires 56 (shown in FIG. 1). Port 31 is connected to connecting wires 56 during manufacturing and, during normal operation, port 31 as well as programmable controller 120 cannot be physically accessed as they are positioned within translucent envelop 454.

Connecting wires 56 connect the programmable controller 120, via electrical contact 51 (shown in FIG. 1), to a suitable external source of electrical power via service wiring to supply the programmable controller 120 with any conventional power service suitable for residential or commercial use. In a second non-limiting example, the external source of electrical power may be in the form of a battery pack associated with the programmable controller 120.

In the embodiment depicted, the programmable controller 120 includes component control ports 58 (including in this embodiment component control ports 58a, 58b ... 58x) for communicating with subsets of light components of the lighting element 122 it is configured to control and one or more input interface ports 59 (including in this embodiment input interface ports 59a, 59b) for receiving control signals for the light bulb 50 the programmable controller 120 is made to control. While in the example of FIG. 2 the controller 120 is shown as having a set including three component control ports 58a, 58b, 58x and two input interface ports 59a and 59b, it should be understood that in practical implementation, the controller 120 may be equipped with any suitable number of component control ports and any suitable number of input interface ports in dependence on the number of lighting components, or subsets of lighting components, it is configured to control. In addition, in certain alternate implementations, input interface ports 59a and 59b may be omitted.

The programmable controller 120 may use the electrical power it receives from the external power source through port 31 to operate the processing unit 122. The processing unit 122 of the programmable controller 120 is also configured to control the distribution of power received through port 31 to the subsets of components of the lighting element 122 through the set of component control ports 58 based on program instructions stored in the firmware 124 and optionally based on information received through input interface ports 59 in order to cause the desired functionality to be implemented by the intelligent light bulb 50. Having regard to the distribution of the electrical power to subsets of components by the controller 120, it noted that suitable circuitry, such as relays, switches and the like (not shown), may also be provided on a suitable hardware platform.

In the example of implementation depicted, the ports in the set of component control ports $58_{a\ldots x}$ may be made to be respectively connected to one or more LED lighting elements and (optionally) the input interface ports 59 may be made to be in communication with a user operable control. The component control ports 58 may thus each be associated to respective subsets of LED lighting elements, wherein each subset may include one or more LED lighting elements. In addition, in specific practical implementations, certain LED lighting elements may he connected to more than one component control ports 58 so that there may be overlap in the composition of the different subsets. Alternatively, the LED lighting elements may be connected to respective component control ports 58 so that there is no overlap in the composition of the different subsets. The specific manner in which the lighting elements are connected to respective component control ports 58 is not critical and may vary between implementations.

In a specific practical example in Which one or more input interface ports 59 are provided, at least one of the input interface ports 59 may be in the form of a wireless receiver. In this example, the processing unit 122 may control the supply of power to the LED light elements to control for example, the activation of the light bulb, the dimming intensity of the light bulb, the color of the light emitted by the light bulb and/or to create special lighting effects, based upon the program instructions stored in the firmware 124 and based upon instruction signals received from the user operable controls through ports 59.

In practical implementations, the hardware platform of the controller 120 will typically include one or more circuit boards on which various circuit elements, including the passive memory component 190, will be provided and interconnected for enabling the desired functionality. The hardware platform of the controller 120 is enclosed within the translucent envelop 454 (shown in FIG. 1) of the intelligent light bulb 50.

It is a feature of the programmable controller 120 that it can be adapted to control different variations/models of an intelligent light bulb in part by installing different associated software options in the firmware 124. Of particular interest in the present document is the configuration/updating of the firmware 124 of the programmable controller 120 in the absence of electrical power being supplied to the controller 120 by an external electrical power source through port 31. As such, the particularity of the functionality and circuitry required for receiving electrical power from an electric power source through port 31 during operation and for distributing electrical power to different components through the set of ports 58 is not critical and will not be described further here.

As mentioned above, the programmable controller 120 includes firmware 124 and a processing unit 122. The processing unit 122 is programmed for operating the light bulb 50 taking into account instructions and/or data stored on the firmware 124, which allows the controller 122 to be used for different variations/models of the light bulb 50 (where the variations/models may be perceptible for example in terms of the features provided by the light bulb) based on the program instructions stored on the firmware 124.

According to an embodiment of the invention, the firmware 124 includes a passive memory component 190. Optionally the firmware 124 may also include an additional memory component 180, which may be of a conventional (or non-passive) memory type. The additional memory unit 180 may store instructions and/or data for controlling the operation of the device or system in addition to the instructions and/or data stored on the passive memory component 190. Optionally in such cases, the processing unit 122 once activated may make use of instructions and/or data stored on the passive memory component 190 to modify, select, or replace instructions in the memory unit 180. In the embodiment depicted, the optional memory unit 180 is of any suitable conventional type and may require an external source of electrical power in order to operate.

The passive memory component 190 for the firmware 124 does not require electrical power to function but rather can operate by drawing electrical power from specific types of signals it is configured for receiving. In a first practical implementation, the passive memory component 190 is built with any suitable hardware components responsive to radio frequency (RF) signals for drawing energy from such signals in such a way as to activate the passive memory component 190.

In practical implementations, the passive memory component 190 may include any suitable commercially available near field communication memory (NFC memory).

Generally speaking, near field communication (NFC) is a communication standards for allowing devices to establish radio communication with each other by touching them together or bringing them into close proximity, usually no more than a few inches although greater ranges are also possible. In specific implementations using NFC, theoretical working distance with compact standard antennas is currently up to about 20 cm, however the practical working distance is about 4 cm. Current NFC standards cover communications protocols and data exchange formats, and are based on existing radio-frequency identification (RFID) standards including ISO/IEC 14443 and FeliCa. NFC builds upon RFID systems by allowing two-way communication between endpoints, where earlier systems such as contactless smart cards were one-way only. Generally speaking, near-field communication uses magnetic induction between two loop antennas located within each other's near field, effectively forming an air-core transformer. In a non-limiting implementation, NFC devices operate within the globally available and unlicensed radio frequency ISM band of 13.56 MHz, although any suitable RF band can be contemplated in alternative implementations.

NFC memory devices of the type contemplated are caused to be activated by a radio frequency (RF) signal transmitted by an NFC enabled auxiliary device 150. Typically such RF signal will be transmitted over a short range RF communication link established between the passive memory component 190 and an external device, such as the auxiliary device 150. Alternatively the passive memory component 190 may include an RFID memory instead of an NFC memory. In such an alternative implementation, the RFID memory is configured to be activated by a radio frequency (RF) signal transmitted by an auxiliary device 150 equipped with an RFID transponder. The controller 120 also includes an interface 192 allowing signals originating from an external device and directed to the passive memory component 190 to propagate so that is reaches the passive memory component 190.

Once the passive memory component 190 is activated by the signal carrying firmware update information originating from the auxiliary device 150, the firmware update information in the signal causes a firmware update process to be performed on the firmware 124. In particular, at least part of the firmware update process is performed in the absence of electrical power being supplied to the programmable controller 120. In specific practical implementations, at least part of the firmware update process may be performed using the signal as the sole source of electrical energy. The firmware update process may modify and/or replace program instructions and/or data stored on the passive memory component 190 based on the firmware update information carried by the signal. At least part of the firmware update process is performed on the passive memory component 190 of the firmware 124 while the passive memory component 190 remains activated using energy drawn from the signal received from the auxiliary device 150.

The manner in which the programmable controller 120 can be configured for different variations/models of the light bulb 50 (shown in FIG. 1) can be done in different manners, two of which will be described for the purpose of illustration.

In accordance with a first non-limiting embodiment, the structure and software required for the different available variations/models of the device are already stored within the firmware 124 of controller 120. In other words, the firmware 124 is pre-programmed such that it includes the structure and the different sets of program instructions necessary for causing the controller 120 to acquire different configurations, each configuration being associated with a respective variation/model of the intelligent light bulb 50. In a non-limiting practical implementation, such instructions may be stored on the additional memory unit 180 however it is to be understood that such instructions or a portion therefore may alternatively be stored on the passive memory component.

In accordance with the second non-limiting embodiment, program instructions for different available variations/models of a device or system are not pre-stored within the firmware 124. Instead, in order to configure the controller 120 for a specific variations/model of the intelligent light bulb 50, program instructions for causing the controller 120 to acquire a specific configuration are provided by an external source during a configuration process and stored on the firmware 124.

In specific practical examples, the different configurations may be associated with different operating characteristic of the intelligent light bulb including but without being limited to differences in light color emitted when the light bulb is activated and/or different manners of operating the light bulb, for example by providing dimming capabilities, lighting patterns, setting a specific desired light intensity or brightness, setting minimum and/or maximum light intensities or brightness (for example in cases of dimmable light bulbs) or other.

Examples of the manner in which the controller 120 may be configured for each of the above two situations will now be described in the sections that follow.

Pre-stored Configurations on the Firmware 124

Referring back to the first non-limiting embodiment in which structure and software required for the different available variations/models of the intelligent light bulb 50 are already stored within the firmware 124. The firmware 124 of the controller 120 stores a first set of program instructions that when activated cause the controller 120 to acquire a first configuration, and a second set of program instructions that when activated cause the controller 120 to acquire a second configuration. In a specific implementation, the first configuration is associated with a first specific variation/model of the intelligent light bulb 50 that the controller is intended to control and the second configuration is associated with a second specific variation/model of the intelligent light bulb 50 that the controller is intended to control. Although only two sets of program instructions are mentioned here, it should be appreciated that any number of sets of program instructions could be stored within the firmware 124. The instructions may be stored on the passive memory component 190 and/or may be stored on the conventional memory component 180.

In order to cause the controller 120 to be configured for a specific variations/model of the intelligent light bulb 50, the controller 120 is caused to implement a given set of program instructions from the pre-stored sets of program instructions. As mentioned above, the different sets of program instructions are operative for causing the controller 120 to acquire different configurations.

In a non-limiting example, the controller 120 is used in a light bulb 50 that includes a lighting element 122 comprised of multiple light components $124_{a\ldots x}$, characterized in that operating in a specific manner specific subsets of the light components may allow respective distinct light colors to be generated by the light bulb. In a practical implementation, the lighting dement 122 may be an LED-type of lighting element and the multiple light components $124_{a\ldots x}$ may be of an LED type of light component.

In a specific example of implementation, the first set of program instructions may he operative for configuring the controller 120 to operate in a specific manner a first subset of the light components so as to allow the light bulb to generate a first specific light color (or first color temperature) and the second set of program instructions may be operative for configuring the controller to operate in a specific manner a second subset of the light components so as to allow the light bulb to generate a second specific light color (or second color temperature). It is to be appreciated that the first subset may include one or more light components that are absent from the second subset of light components (or vice versa).

Alternatively, the first and second set of program instructions may cause the controller 120 to control a same subset of light components, but the first set of program instructions configures the controller 120 to operate the intelligent light bulb in a first manner while the second set of program instructions is for enabling the controller to operate the intelligent light bulb to control in a second manner. For example, a same subset of light components may be used to generate different light colors by varying the manner in which the individual light components are operated, for example by varying their individual intensity of operation in order to achieve a desired light color (or color temperature).

Some other examples of manners of operating a light bulb may include, without being limited to:
a) enabling (or disabling) dimming functionality;
b) setting a desired light intensity or brightness of the light bulb by selecting a specific desired light intensity from a set, or from a range, of possible light intensities. For example, this may allow varying the intensity of the light bulb to achieve an intensity resembling that of a 40 W incandescent light bulb, 60 W incandescent light bulb, a 100 W incandescent light bulb or any other suitable lighting intensity.
c) setting a desired maximum and/or a minimum intensity (brightness) for the light bulb by selecting a maximum and/or a minimum intensity from a set, or from a range, of possible maximum and/or a minimum light intensities;
d) enabling (disabling) lighting patterns. Lighting patterns may include, for example:
  a. activating/deactivating light components over time; and/or
  b. modifying light color over time; and/or
  c. modifying light intensity over time.

Again, although only two sets of program instructions for configuring the controller 120 in two different ways are being described herein, the controller 120 may be suitable for pre-storing any number of sets of program instructions for acquiring any suitable number of different configurations.

In accordance with a specific implementation, the information necessary for causing the controller 120 to acquire one of the configurations that has been pre-stored within the controller's firmware 124 is stored in the passive memory component 190 as part of a firmware update process. More specifically, the passive memory component 190 is responsive to a signal carrying firmware update information received from the auxiliary device 150 for drawing energy from that signal to activate the passive memory component 190 and causing at least part of a firmware update process to be performed.

The firmware update information carried by the received signal may be stored on passive memory component 190 and may be operative for configuring the controller 120 by causing one of the pre-stored sets of program instructions to be implemented such that the controller 120 operates by executing the implemented set of program instructions. The information stored on the passive memory component 190 as part of the firmware update process may include an access code, or a set of program instructions, that may be processed by the processing unit 122 of the controller 120 for causing the controller 120 to select a set of program instructions from the pre-stored set of program instructions on the firmware 124.

In a specific implementation, part of the firmware update process may include storing at least part of the firmware update information on the passive memory component 124 while the passive memory component 124 remains activated using energy drawn from the signal received from the auxiliary device 150.

In some embodiments, another part of the firmware update process may be performed by the processing unit 122 once it becomes activated using an external source of electric power. in particular, in a specific implementation, the processing unit 122, once it becomes activated using an external source of electric power, is configured for processing the information stored on passive memory component 190 in order to cause controller 120 to acquire one of the configurations that has been pre-stored within the controller's firmware 124 as part of the firmware update process. The information stored on the passive memory component 190 and that allows the controller 120 to acquire one of the configurations that has been pre-stored within the controller's firmware 124 may include a single access code, or a single program element, that acts as a key to select the appropriate set of program instructions that are pre-stored within the firmware 124 of the controller 120. In a non-limiting example, the processing unit 122 is programmed for selecting the specific configuration stored in the firmware 124 at least in part by processing the access code, or for executing the single program element, to select a portion of the instructions stored on the firmware 124, where the selected portion of the instruction implements the specific configuration.

Not All Configurations Pre-stored on the Firmware 124

Referring now to the embodiment in which the firmware 124 of the controller 120 does not store program instructions for all different available variations/models of the intelligent light bulb 50 that the controller may be configured to operate, firmware update information including a set of program instructions may be provided to the passive memory component 190 through a signal originating from auxiliary device 150. The set of program instructions is associated with a specific variation/model of the intelligent light bulb 50 to be controlled. As such, the signal received from the auxiliary device 150 and conveying firmware update information 160 is operative for configuring the controller 120 by causing a set of program instructions to be uploaded to and stored on the passive memory component 190 of the controller 120.

Optional Error Log

Optionally, the processing unit 122 may further be programmed to maintain an error log on the passive memory component 190 of the firmware 124 to keep track of errors and (or) malfunctions that may occur during operation of the controller 120. For example, processing unit 122 may be programmed for storing on the passive memory component 190 data conveying operational characteristics of the intelligent light bulb 50 it is controlling, such as for example current/voltage characteristics, error messages, data conveying improper operation and the like. A person skilled in the art will appreciated that such information stored in an error log may provide some insight and may facilitate trouble shooting by allowing the technician to access the data without have to activate the controller 120. The error log may include a variety of different types of data associated with the operation of the intelligent light bulb 50. The specific content of the error log is not critical to the invention and will therefore not be described in further detail here.

In specific practical implementations, the passive memory component 190 of the controller 120 may be comprised of distinct memory subcomponents, wherein each memory subcomponent may store different types of data and/or instructions. For example one memory subcomponent may be for storing firmware update information in the form of data and/or instructions and another memory subcomponent may be for storing device status information (such as an error log). In such an implementation, the memory subcomponent storing the device status information may be responsive to a signal originating from auxiliary device 150 carrying a first type of information (a device status request) while another memory subcomponent may he for storing firmware update information and may be responsive to a signal carrying a second type of information (firmware update information).

Now that an example of a structure of the programmable controller 120 has been presented, we now turn to the auxiliary device 150.

Auxiliary Device 150

As shown in FIG. 2, the auxiliary device 150 includes a processing unit 202, a memory 200 in communication with the processing unit 202 via a data communication bus and a communication interface 54, In practical implementations, the communication interface 54 may include an RF transceiver to enable the auxiliary device 150 to communicate with the controller 120 over a short range RF communication link 175 established between the passive memory component 190 and the auxiliary device 150. Obviously, in order for the interface 54 on the auxiliary device 150 to establish a communication link with the interface 192 on the controller 120, the two types of interfaces 192 and 54 are configured to be able to interact with one another.

In practical implementations in which the passive memory component 190 includes a near field communication memory (NFC memory), the auxiliary device 150 is an NFC enabled device and the communication interface 54 includes an NFC transceiver. In this particular example, the auxiliary device 150 may be embodied as a NFC enabled PDA, NFC enabled smart phone, NFC enabled dedicated firmware update device or any other suitable type of NFC enabled device.

In practical implementations in which the passive memory component 190 includes a RFID memory, the auxiliary device 150 includes an RFID reader and the communication interface 54 includes an RFD transceiver.

The auxiliary device 150 is programmed with suitable software instructions 206 for allowing the auxiliary device 150 to obtain and store in its memory 200 firmware update information 160 in association with the programmable controller 120. The auxiliary device 150 may obtain the firmware update information 160 in any number of suitable ways including, without being limited to: (i) accessing a remote server over a network, wherein remote server may store the firmware update information; (ii) receiving a communication (such as an e-mail message over a network from another device conveying the firmware update information; and/or (iii) establishing a communication link over a communication interface with a memory device, such as a USB stick, wherein the memory device stores the firmware update information. Optionally the auxiliary device 150 may be programmed with suitable software instructions 206 for allowing the auxiliary device 150 to obtain and store in its memory an error log (not shown) in association with the programmable controller 120.

The auxiliary device 150 is also programmed with suitable software instructions 206 for transmitting signals over a wireless communication link 175 established between itself and the controller 120.

In a specific example of implementation, a signal transmitted from the auxiliary device 150 conveys firmware update information and is configured for causing the passive memory component 190 of the controller to be activated by drawing energy from that signal. Following this, the signal is configured for causing a firmware update process to be performed at the passive memory component 190 based on the update information carried by the signal. At least part of this update process can advantageously be performed while the passive memory component 190 remains activated using energy drawn from the signal and without requiring electrical power to be supplied from an external source.

Referring back to the non-limiting embodiment in which structure and software required for the different available variations/models of the intelligent light bulb 50 (shown in FIG. 1) are already pre-stored within the firmware 124, the firmware update information 160 within the auxiliary device 150 provides the information necessary for causing the controller 120 to acquire one of the pre-stored configurations. The firmware update information 160 stored on the auxiliary device 150 may include a code, or a set of program instructions, for causing the controller 120 to select from the firmware 124 a set of program instructions from the pre-stored set of program instructions. The firmware update information 160 that is stored on the auxiliary device 150 may include a single access code, or a single program element, that acts as a key to select the appropriate set of program instructions that are pre-stored within the firmware 124 of the controller 120.

Referring now to the alternative non-limiting embodiment in which program instructions for different available variations/models of the intelligent light bulb 50 are not all pre-stored within the firmware 124 of the controller, the firmware update information 160 provided by the auxiliary device 150 may include one or more sets of program instructions that can be uploaded to the controller 120, wherein each set of program instructions is associated with a respective configuration. The firmware update information 160 may include only a single set of program instructions associated to a specific variation/model of the device to be controlled. Alternatively, the firmware update information 160 stored on the auxiliary device 150 can include a plurality of sets of program instructions, such that each set of program instructions would configure the controller 120 in a different way and be associated with a respective variations/model of the intelligent light bulb 50 to be controlled by the controller 120. The appropriate set of program instructions to be provided to the controller 120 can be selected based on a selection made by a user, and/or based on an input of a serial number, and/or based on other selection criteria, provided via an interface provided on the auxiliary device 150.

In a non-limiting example of implementation, it is possible that the firmware update information 160 includes a program element, such as an "autoexec" file, that provides the controller 120 with the necessary information to complete the configuration process when the controller is later activated after being connected to a source of electrical power.

Figure 3:
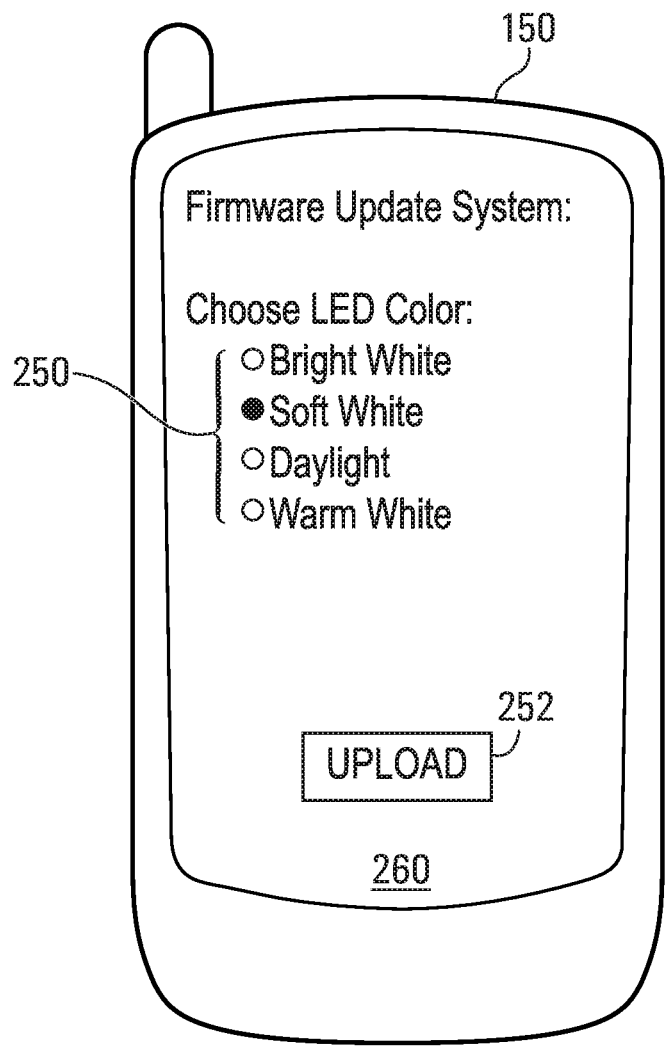
FIG. 3 shows a specific example of an auxiliary device having a display screen on which a user interface in accordance with a non-limiting example of implementation is displayed for use in configuring an intelligent light bulb of the type depicted in FIG. 1 in accordance with a non-limiting example of implementation of the present invention.

FIG. 3 shows an auxiliary device 150 in the form of a smartphone 150' having a display screen on which a user interface 260 in accordance with a non-limiting example of implementation is displayed. The user interface 260 presents the user with a set of user selectable items 250, wherein each item in the set is associated with a respective variation/model of the intelligent light bulb 50 to be controlled by the controller 120. In the example depicted four variations/models of such the intelligent light bulb 50 in the form of different light colors are provided as options namely: bright white, soft white, daylight and warm white. Each option for a variation/model of the intelligent light bulb 50 is associated with corresponding firmware update information. The set of user selectable items 250 is provided with user operable controls, which in the example depicted variations/model of the intelligent light bulb 50 are in the form of radio buttons, to enable a user of the smart phone 150' to make a selection. The interface 260 is also provided with a control 252. When actuated, the control 252 causes the auxiliary device 150 to generate and transmit a signal to the controller 120 over communication link 175, the signal carrying firmware update information associated with the selected configuration. It is to be appreciated that the example depicted in FIG. 3 is but one possible example of implementation and that many alternative embodiments are possible and will become apparent to the person skilled in the art in light of the present description.

The firmware update information carried by the signal transmitted from the auxiliary device 150 to the controller may convey, for example, program instructions, data, and/or one or more access codes associated with the sets of program instructions stored in the firmware 124 of the controller.

Process for Configuring Controller 120 of the Light Bulb 50

Figure 4:
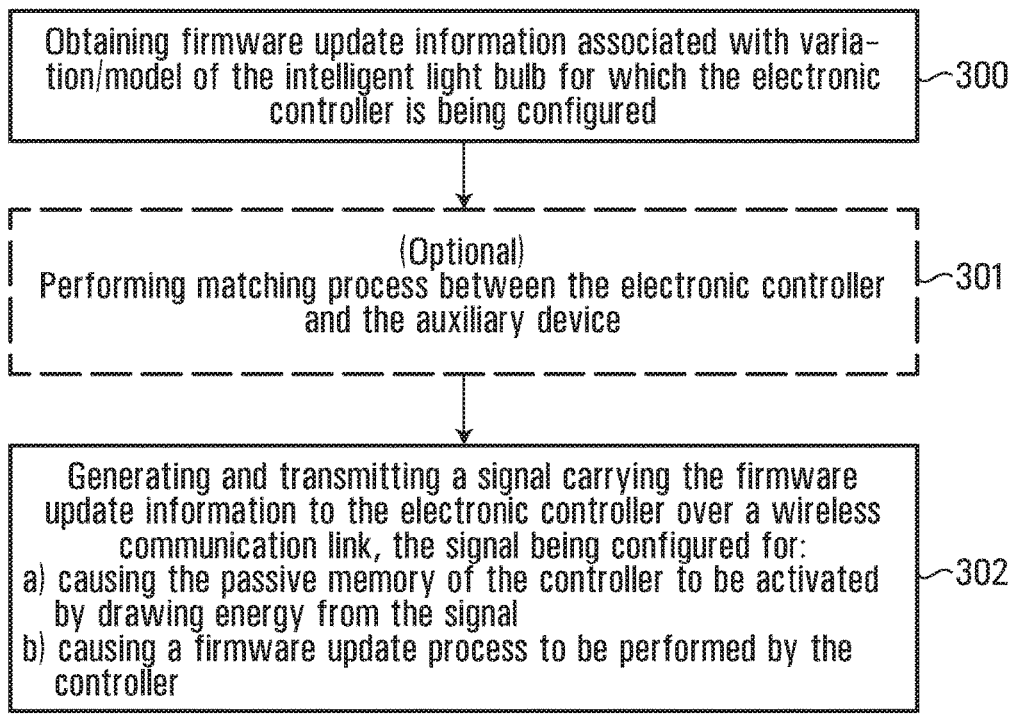
FIGS. 4 and 5 are flow diagrams of processes for configuring the programmable controller shown in FIG. 2 using the auxiliary device shown in FIG. 3 in accordance with a non-limiting example of implementation of the present invention.
Figure 5:
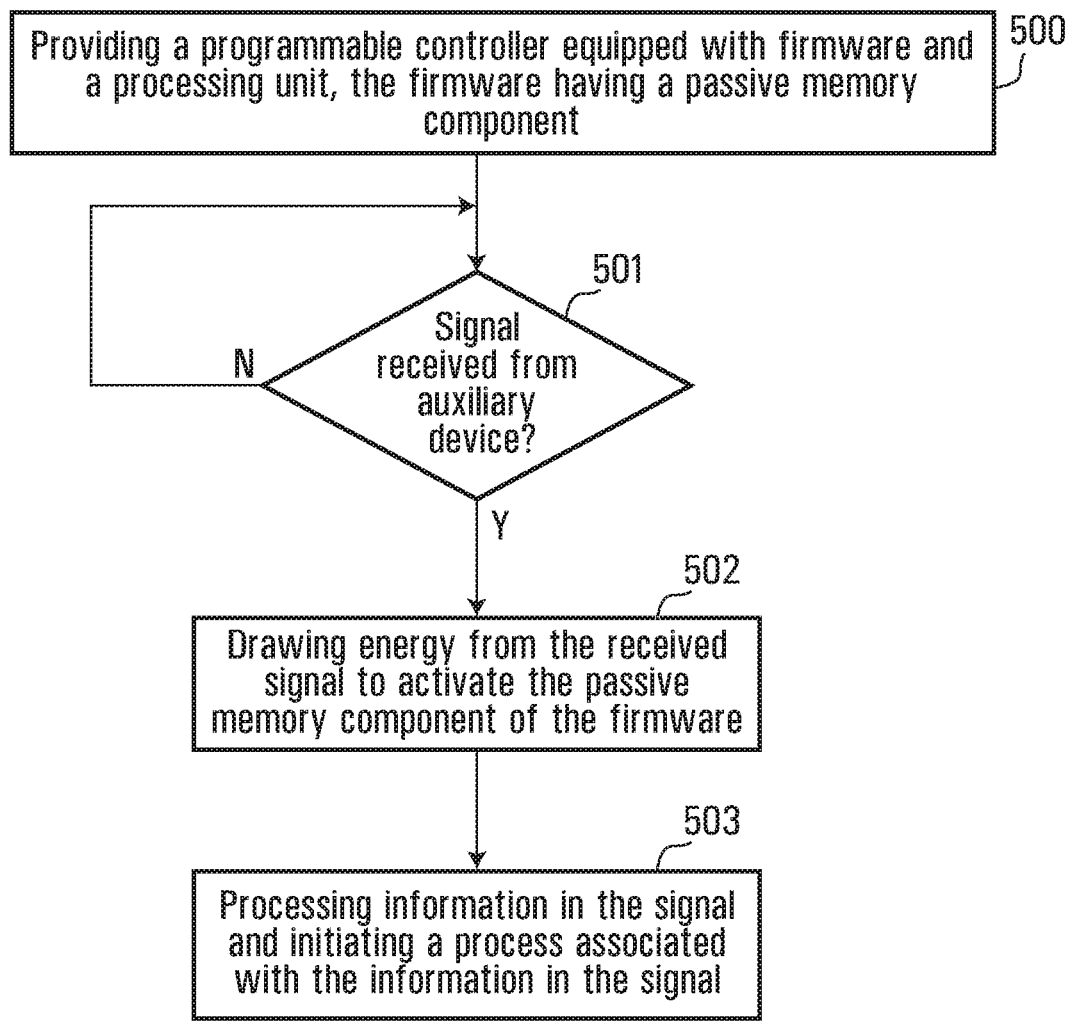

With reference to FIGS. 4 and 5, a specific process that may he implemented for configuring controller 120 using auxiliary device 150 for a specific variation/model of an intelligent light bulb will now be described. FIG. 4 shows steps of this process associated with the auxiliary device 150 while FIG. 5 shows steps associated with the controller 120.

Starting with FIG. 4, at step 300, firmware update information associated with a specific variation/model of the intelligent light bulb for which the controller 120 is being configured is obtained at the auxiliary device 150. The manner in which the firmware update information at step 300 may be obtained in practical implementations may vary from one implementation to the other and any suitable approach may be used. In the case where the auxiliary device 150 includes functionality allowing it to connect to a computer network, the firmware update information may for example be downloaded into the memory 200 of the auxiliary device 150 by using the auxiliary device 150 to access a remote server on which the firmware update information is stored. Alternatively, firmware update information may be stored on a computer readable medium, such as a flash drive, hard drive, memory stick, DVD and then loaded onto the memory 200 of auxiliary device 150 by establishing a suitable connection between the computer readable medium and the auxiliary device 150. The established connection may be performed either over a wire line link or wireless link using any suitable method.

Alternatively, or in addition to the above, obtaining firmware update information may include presenting a user of the auxiliary device 150 with a set of selectable options, wherein each option is associated with a specific available variation/model of the intelligent light bulb for which the controller 120 can be configured as well as the associated firmware update information. Such selectable options may be presented to the user in a graphical user interface (GUI) displayed on a display device associated with the auxiliary device 150(of the type shown for example in FIG. 3). Functionality may be provided on the auxiliary device 150 through the GUI for enabling the user to select a desired option using any suitable user operable input device, such as a keyboard, touch screen, voice input and the like. Once the firmware update information associated with the specific variation/model of the device (or system) for which the controller 120 is being configured has been obtained, the process proceeds to step 302.

At step 302, a signal carrying the firmware update information obtained at step 300 is generated and transmitted from the auxiliary device 150 to the controller 120 over wireless communication link 175. The transmittal by the auxiliary device 150 of the signal carrying the firmware update information may be triggered in any number of manners including, but not limited too, a command enter by a user through a user operable input control at the auxiliary device 150 (e.g. using a keyboard, touch sensitive screen, voice input and the like), by using a mechanism for detecting whether the auxiliary device 150 is in proximity to the controller 120 or by using any other suitable approach. In the non-limiting example depicted in FIG. 3, the transmittal by the auxiliary device 150 of the signal is triggered by actuating control 252 labeled "UPLOAD". The signal carrying the firmware update information is for causing the passive memory component 190 of the controller 120 to be activated by drawing energy from that signal and for causing a firmware update process to be performed by the controller 120 based on the update information. carried by the signal while the passive memory component remains activated using energy drawn from the signal. As described elsewhere in the present document, the firmware update process may modify and/or replace program instructions and/or data stored on the passive memory component 190 based on the firmware update information carried by the signal.

In a specific implementation in which the auxiliary device 150 is equipped with an NFC (or RFID) transceiver and the controller 120 is equipped with an NFC (or RFID) memory, the NFC (or RFID) transceiver of the auxiliary device 150 is configured for transmitting to the controller 120 a signal carrying the firmware update information over wireless communication link 175. The signal carrying the firmware update information causes the NFC (or RFID) memory to be activated by drawing energy from the signal.

Optionally, a process for matching the auxiliary device 150 to the controller 120 may be performed at step 301 prior to the transmittal of the signal carrying the firmware update information at step 302. A purpose for such a matching process may be, for example, to ensure that the firmware update information that will be transmitted from the auxiliary device 150 is being installed on the correct controller (or correct type of controller). According to this optional feature, the passive memory component 190 of the controller 120 may store (amongst other) an identification code. In a non-limiting implementation, the identification code may convey the type of hardware platform associated with the controller 120. When the transceiver of the auxiliary device 150 comes into proximity of the passive memory component 190 of the controller, a "connection request signal" issued by the transceiver causes the passive memory component 190 to be activated by drawings energy from the "connection request signal" and to transmit the identification code stored on the passive memory component 190 to the auxiliary device 150. The identification code may be used by the auxiliary device 150 to recognize the controller 120 and confirm that it is acceptable to transmit the firmware update information to that controller. Optionally, an identification code identifying the auxiliary device 150 may also be transmitted as part of the "connection request signal". In such cases, the passive memory component 190 of the controller may then store the identification code identifying the auxiliary device 150. Once the controller 120 has been confirmed by auxiliary device 150, a signal carrying the firmware update information may be transmitted in the manner described earlier from the auxiliary device 150 to the controller 120 over the wireless communication link 175.

Optionally, (not shown in the figures) the auxiliary device 150 may be configured for transmitting to the controller 120 a signal carrying a device status request over wireless communication link 175 for causing the passive memory component 190 to perform a status report process. The status report process will be particularly useful in implementations in which an error log associated with the device operated by the controller 120 is maintained on the passive memory component 190. During the status report process, a reply signal conveying at least part of the data in the error log stored on the passive memory device is received by the auxiliary device 150 over the wireless communication link established between the passive memory component 190 and the auxiliary device 150.

Turning now FIG. 5, a flow diagram is depicted showing steps of a process for configuring controller 120 using auxiliary device 150 from the perspective of the controller 120.

At step 500, a programmable controller 120 of the type shown in FIG. 2 is provided. The programmable controller 120 is characterized by a hardware platform that can be configured to be used in connection with different variations/models of the intelligent light bulb, where the variations/models may be perceptible for example in terms of the features provided by the intelligent light bulb. In the case of the programmable controller 120 provided, configuring the programmable controller to the different variations/models of the intelligent light bulb includes the installation of different associated software options. In this regards, the hardware platform of the programmable controller provided at step 500 is equipped with firmware 124 having a passive memory component 190 and a processing unit 122 programmed for operating the system at least in part in accordance with instructions stored on the firmware 124. The passive memory component 190 of the firmware 124 can be activated using power drawn from a signal transmitted from auxiliary device 150 over wireless communication link 175. In a specific implementation in which the auxiliary device 150 is equipped with an NFC (or RFID) transceiver, the passive memory component 190 may include an NFC (or RFID) memory, the NFC (or RFID) memory being configured for being activate by drawing energy from a signal originating from the auxiliary device 150.

Following step 500, the process proceeds to step 501.

At step 501, the programmable controller 120 may he an inactive state and may remain in that state until a signal originating from the auxiliary device 150 is received. In this inactive state, the programmable controller 120 need not be connected to an external source of electrical power. In specific practical implementations, the intelligent light bulb 50 may have been packaged for shipping, in a box and/or other shipping container. When the intelligent light bulb 50 is packaged prior to configuring the firmware 124, the box or container used for the shipping is configured to allow RF signals transmitted by the auxiliary device 150 positioned in proximity to the box or container to reach the passive memory component 190 of the firmware 124. For example, conventional cardboard boxes and plastic-based wrapping materials may be suitable for such packaging. Once a signal originating from the auxiliary device 150 is detected by the passive memory component 190, the process proceeds to step 502.

At step 502, the passive memory component 190 of the firmware 124 becomes activated by drawing energy from the signal originating from the auxiliary device 150.

The process then proceeds to step 503.

At step 503, while it remains activated using energy drawn from the signal originating from the auxiliary device 150, the passive memory component 190 processes the information carried by the signal originating from the auxiliary device 150. The information carried by the signal may cause different processes to be performed depending on the type of information carried by the signal.

For the purpose of illustration, the description will consider the following types of information that may be carried by the signal received from the auxiliary device: (a) firmware update information; (b) a connection request; and (c) a device status request.

In a first example in which the information carried by the signal includes firmware update information, the passive memory component 190 causes a firmware update process to be performed. The firmware update process includes modifying instructions and/or data stored in the passive memory component 190 based on the update information carried by the signal. At least part of the firmware update process is performed while the passive memory component remains activated using energy drawn from the signal originating from the auxiliary device 150.

In a second example in which the information carried by the signal includes a connection request, the passive memory component 190 may cause a component matching process to be performed. In a specific embodiment supporting the component matching process, the passive memory component 190 of the controller may store (amongst other) an identification code. In a non-limiting implementation, the identification code may convey the type of hardware platform associated with the controller 120. The component matching process includes causing the passive memory component 190 to transmit the identification code to the auxiliary device 150. The identification code may be used by the auxiliary device 150 to recognize the controller 120 and determine whether specific firmware update information is suitable for that controller. Optionally, a code may also be transmitted as part of the "connection request signal" from the auxiliary device 150. In such cases, the passive memory component 190 may store the code received from the auxiliary device 150 as part of the component matching process. The code transmitted from the auxiliary device 150 may include a component identifying the auxiliary device 150 and, optionally may include a key based on which the passive memory component 190 may determine whether to accept further information, including firmware update information, from the auxiliary device 150. In a non-limiting implementation, the successful completion of a component matching process between the controller 120 and a specific auxiliary device 150 may be required prior to the controller 120 accepting firmware update information from that auxiliary device 150. In such non limiting implementations, only once the component matching process has been completed can the controller 120 and the auxiliary device 150 communicate with one another. The component matching process of the type described above may be performed while the passive memory component 190 remains activated using energy drawn from the signal originating from the auxiliary device 150. It is to be appreciated that the component matching process may be omitted from certain implementations and is considered to be an optional process in the context of the present invention.

In a third example in which the information carried by the signal includes a device status request, the passive memory component 190 causes a status report process to be performed. The status report process will be particularly useful in implementations in which an error log associated with the device operated by the controller is maintained on the passive memory component 190. During the status report process, a reply signal is sent by the passive memory component 190 in response to the device status request signal The reply signal conveys at least part of the data in the error log stored on the passive memory device is transmitted to the auxiliary device 150 over the wireless communication link established between the passive memory component 190 and the auxiliary device 150. The transmittal of the reply signal to the auxiliary device 150 is performed while the passive memory 190 component remains activated using energy drawn from the signal carrying the device status request.

It is to be understood that the signals originating from the auxiliary device 150 may carry information elements of the type suggested above alone or in combination (for example a combination of a connection request signal +firmware update information). It is also to be appreciated that practical implementations need not support all the above described types of information. For example certain non-limiting implementations may support signals carrying firmware update information and may not support signals carrying a device status request and/or a connection request, for example. In addition, it is also to he understood that the signal originating from the auxiliary device 150 may carry other types of information and that the specific examples presented here are been provided for the purpose of illustration only.

Practical Examples

Using the concepts described above, a light bulb manufacturer can manufacture an intelligent light bulb, of the type described with reference to the intelligent light bulb 50, having a hardware platform that can be used to control different variations/models of an intelligent light bulb. Depending on the desired features of the intelligent light bulb, the firmware 124 can be configured for a specific variation/model of the intelligent light bulb using a suitable auxiliary device 150 without having to activate the controller 120 using an external source of electrical power by using processes and tools of the type described in the present document.

The intelligent light bulbs of the type described in this document present advantages over some conventional intelligent light bulbs by allowing the firmware of the intelligent light bulb controllers to be configured and/or updated without having to connect the intelligent light bulb to an external source of electrical power. This may allow for example, a manufacturer to build the intelligent light bulb and pre-package them before finalizing the configuration of the firmware in order to have an inventory of ready to ship intelligent light bulbs that only require the firmware to be updated/configured. As a result, the delay between the receipt of an order and the time to shipment may be significantly reduced since the intelligent light bulb controllers need not be activated for such update/configuration to be performed and since the controllers are already in ready-to-ship packages.

Figure 6A:
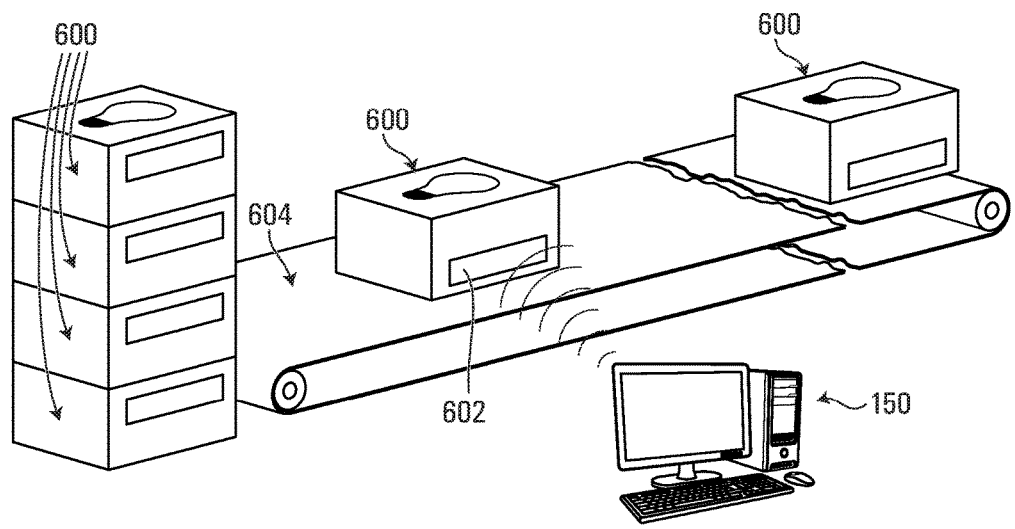
FIG. 6A shows a conceptual block diagram of a portion of an assembly line used for configuring intelligent light bulbs of the type depicted in FIG. 1 in accordance with a first non-limiting example of implementation of the present invention.
Figure 6B:
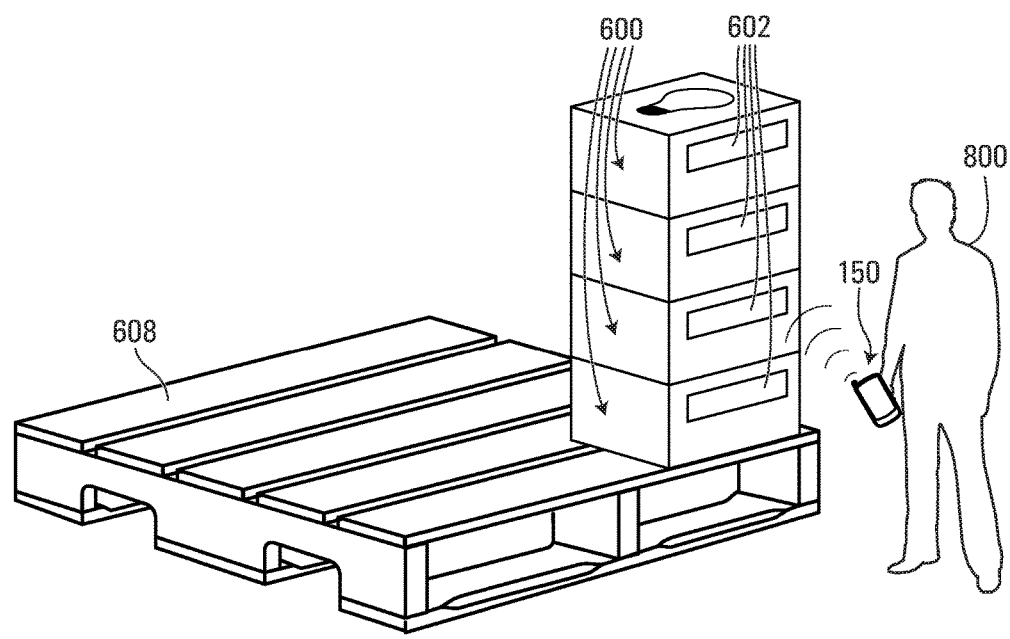
FIG. 6B shows a plurality of intelligent light bulbs packaged in boxes and stacked for storage and/or shipment and an auxiliary device for configuring the packaged intelligent light bulbs in accordance with a second non-limiting example of implementation of the present invention.

FIGS. 6A and 6B show examples in which intelligent light bulbs of the type described in the present document have been built by a manufacturer and packaged for shipment. While this cannot be seen in FIGS. 6A and 6B, it is to be understood that shipping boxes 600 hold intelligent light bulbs of the type described in the present document. Once the manufacturer knows what variations/models of intelligent light bulbs are desired, the manufacturer makes use of an auxiliary device 150 in order to program the firmware of the intelligent light bulb controllers, More specifically, the auxiliary device 150 is brought into proximity with each one of the shipping boxes 600 that holds an intelligent light bulb that is to be configured so that the passive memory components 124 of the firmware is activated by a signal transmitted from the auxiliary device 150 in order to perform a firmware update process in accordance with the process described earlier on in the present document. Optionally, the shipping boxes 600 provide respective indicators 602 to identify the area of the shipping boxes 600 that is most suitable to be brought into proximity with the auxiliary device 150 in order to facilitate the communication between the passive memory component of the intelligent light bulb in the box and the auxiliary device 150.

FIG. 6A shows a first example in which individual shipping boxes 600 holding intelligent light bulbs are placed on a conveyor belt 604 which causes each shipping box to pass by an auxiliary device 150 that is in the form of a dedicated programming station. As a shipping box 600 is carried by the conveyor belt in proximity to the auxiliary device 150, a signal carrying firmware update information is transmitted from the auxiliary device 150 to the specific intelligent light bulb in the shipping box 600 thereby causing a firmware update process to be performed to modify the instructions of the firmware of that specific intelligent light bulb. The firmware update process is performed based on the update information carried by the signal in accordance with the processes described earlier in the present document.

FIG. 6B shows a second example in which shipping boxes 600 holding intelligent light bulbs are stacked on a shipping pallet 608 and in which an auxiliary device in the form of a portable auxiliary device 150, such as a smartphone for example, is used for configuring the firmware of the intelligent light bulbs held in the boxes. In this example, the auxiliary device 150 is brought into proximity with each of the individual shipping boxes 600 by a human operator 200 or by a mechanical device such as a robotic arm for example (not shown in the figures). As the auxiliary device 150 is brought into proximity with a shipping box 600, a signal carrying firmware update information is transmitted from the auxiliary device 150 to the specific intelligent light bulb in the shipping box 600 thereby causing a firmware update process to be performed to modify the instructions of the firmware of that specific intelligent light bulb. The firmware update process is performed based on the update information carried by the signal in a manner of the type described earlier in the present document. Alternatively, the intelligent light bulbs and/or the auxiliary device may be equipped with components having emission and reception capabilities with a broader range so that data can be received/transmitted without the auxiliary device needing to be displaced for each individual shipping box.

FIGS. 6A and 6B are only specific practical examples showing two manners in which a manufacturer may use the concepts presented in the present document in order to facilitate the configuration of intelligent light bulbs to adapt to different variations/models. It is to be appreciated that many other manners will become apparent to the person skilled in the art in light of the present description.

Alternatively, rather than (or in addition to) being performed by the light bulb manufacturer, the configuring of the firmware 124 may be performed by a distributor of the intelligent light bulbs. In such a case, the manufacturer of such light bulbs may supply the distributor with a number of intelligent light bulbs for which the firmware has not yet been configured (or alternatively the firmware has been configured in a default manner). In order to enable the distributor to customize a specific intelligent light bulbs for a specific variation/model, the manufacturer may make available computer code executable by an auxiliary device of the type described with reference to auxiliary device 150 either by making this code accessible over a computer network or by providing a non-transitory computer readable memory storing such computer code to the distributor.

The configuration of light bulbs of the type presented in the present document can also alternatively be updated/configured by an end user of the intelligent light bulbs in a convenient and straight forward manner using a suitably programmed auxiliary device 150. This may, for example, allow a user to adjust the color of the light emitted by the light bulb after the bulb was purchased and installed. In a non-limiting example, a user may be hesitating between buying an LED bulb having "warm white" light and another one having a "soft white" light. With the type of intelligent light bulb presented in the present document, a user may purchase a light bubble capable of generating a "warm white" light and a "soft white" light and the user may be able to an auxiliary device of the type described in the presentation document to adjust the color of the light emitted by the light bulb at home, when the bulb is in use in its desired environment.

Although the present invention has been described in considerable detail with reference to certain preferred embodiments thereof, variations and refinements are possible. Therefore, the scope of the invention should be limited only by the appended claims and their equivalents.

The invention claimed is:

1. An intelligent light bulb comprising:
   a) a light bulb body having:
      i) a translucent envelop; and
      ii) a connector for securing the light bulb body to an external electrical socket, the connector including an electrical contact for establishing an electrical connection with a source of electrical power through the external electrical socket;
   b) an LED lighting element encapsulated within said light bulb body, wherein in operation light generated by the LED lighting element shines through the translucent envelop of the light bulb body;
   c) a programmable controller encapsulated within said light bulb body and in communication with said LED lighting element, said programmable controller comprising:
      i) a passive memory component configured to be responsive to a signal received over a wireless communication link from a device external to the intelligent light bulb for:
         (1) drawing energy from said signal to activate the passive memory component; and
         (2) causing an update process to be performed to modify information stored on said passive memory component based on update information carried by the signal, at least part of said update process being performed while the passive memory component remains activated using energy drawn from said signal;
      ii) a processing unit in communication with said passive memory component, said processing unit being programmed for operating the LED lighting element at least in part in accordance with the information stored on said passive memory component.

2. The intelligent lightbulb defined in claim 1, wherein the passive memory component includes a near field communication memory (NFC memory).

3. The intelligent light bulb defined in claim 1, wherein said passive memory component is configured to be responsive to the signal carrying update information received from the external device for causing at least part of the update process to be performed in the absence of electrical power being supplied to the light bulb by a source of electrical power external to the intelligent light bulb.

4. The intelligent light bulb defined in claim 3, wherein said passive memory component is configured to be responsive to the signal carrying update information received from the external device for causing at least part of the update process to be performed using said signal as the sole source of electrical energy.

5. The intelligent light bulb defined in claim 4, wherein the update information includes program code for implementing one of a first light bulb configuration and a second light bulb configuration.

6. The intelligent light bulb defined in claim 5, wherein said LED lighting element comprises multiple LED light components characterized in that:
   a) operating in a specific manner a first subset of said LED light components allows a first light color to be generated by the light bulb; and b) operating in a specific manner a second subset of said LED light components causes a second light color to be generated by the light bulb, wherein said first light color is visually distinguishable from said second light color.

7. The intelligent light bulb defined in claim 6, wherein said first light color is a first white light color associated with a first color temperature and where said second light color is a second white light color associated with a second color temperature.

8. The intelligent light bulb defined in claim 5, wherein said processing unit is programmed for:
a) operating the first subset of the LED light components of the intelligent light bulb when operating the intelligent light bulb in accordance with the first configuration; and
b) operating the second subset of the LED light components when operating the intelligent light bulb in accordance with the second configuration.

9. The intelligent light bulb defined in claim 1, wherein the information stored in the passive memory component includes program code implementing a set of light bulb configurations, said set of light bulb configurations including at least a first light bulb configuration and a second light bulb configuration.

10. The intelligent light bulb defined in claim 9, wherein the update information conveys an access code, the access code being associated with a specific light bulb configuration from said set of light bulb configurations, and wherein, following the performance of the update process, the processing unit operates the intelligent light bulb in accordance with the specific light bulb configuration associated with the access code.

11. The intelligent light bulb defined in claim 10, wherein the processing unit is programmed for selecting the specific configuration from said set of light bulb configurations at least in part by processing the access code to select a portion of the information stored on the passive memory component, where the selected portion of the information includes instructions for implementing the specific light bulb configuration.

12. The intelligent light bulb defined in claim 11, wherein said LED lighting element comprises multiple LED light components characterized in that operating in specific manners specific subsets of the LED light components allow respective distinct light colors to be generated by the light bulb and wherein the instructions enable operating at least one specific subset of the LED light components in at least one specific manner.

13. The intelligent light bulb defined in claim 12, wherein at least some light bulb configurations in said set of light bulb configurations are associated with respective subsets of the LED light components.

14. The intelligent light bulb defined in claim 13, wherein:
a) the update process includes storing the update information carried by the signal on the passive memory component; and
b) wherein the processing unit of the controller is programmed for:
  i) selecting a specific configuration from the set of configurations implemented by the program code at least in part by processing the update information stored on the passive memory component; and
  ii) operating the intelligent light bulb in accordance with the selected specific configuration implemented by the program code.

15. The intelligent light bulb defined in claim 1, wherein the passive memory component is configured for communicating with the device external to the intelligent light bulb over a short range radio frequency (RF) communication link established between the passive memory component and the device external to the intelligent light bulb.

16. An auxiliary device suitable for configuring an intelligent light bulb, the intelligent light bulb comprising a plurality of LED light components and a programmable controller, the programmable controller comprising a memory module having stored thereon firmware including instructions for controlling operations of the plurality of LED light components, said memory module including a memory component on which at least a portion of the firmware is stored, the programmable controller being programmed for operating the intelligent light bulb at least in part in accordance with the instructions stored on the memory module, said auxiliary device comprising:
a) a communication interface suitable for communicating with the programmable controller over a wireless communication link;
b) a processing unit in communication with the communication interface programmed for transmitting a signal over the wireless communication link to the intelligent light bulb carrying firmware update information, the signal being configured for:
  causing a firmware update process to be performed by the programmable controller to modify the instructions of the firmware based on the firmware update information carried by the signal, the firmware update information carried by the signal including program code implementing a specific light bulb configuration, wherein the plurality of LED light components are characterized in that operating in specific manners specific subsets of the plurality of LED light components allow respective distinct light colors to be generated by the intelligent light bulb and wherein the specific light bulb configuration implemented by the firmware update information is associated with at least one specific distinct subset of the LED light components so that the intelligent light bulb is caused to generate a corresponding specific light color when operated in a specific manner.

17. The auxiliary device defined in claim 16, wherein the auxiliary device is embodied in an NFC enabled smartphone and wherein the memory component including a near field communication memory (NFC memory).

18. The auxiliary device defined in claim 16, wherein the firmware update process causes the program code implementing the specific light bulb configuration to be stored on the memory module of the controller to enable the controller of the intelligent light bulb to operate the intelligent light bulb based on the specific light bulb configuration implemented by the program code.

19. A method for configuring an intelligent light bulb, the intelligent light bulb comprising a plurality of LED light components and a programmable controller, the programmable controller comprising a memory module having stored thereon firmware including instructions for controlling operations of the plurality of LED light components, said memory module including a memory component on which at least a portion of the firmware is stored, the programmable controller being programmed for operating the intelligent light bulb at least in part in accordance with the instructions stored on the memory module, said method comprising:

a) using an auxiliary device, obtaining firmware update information associated with the intelligent light bulb;
b) using the auxiliary device, transmitting a signal carrying the firmware update information to the intelligent light bulb over a wireless communication link, the signal being configured for causing a firmware update process to be performed to modify the instructions of the firmware based on the update information carried by the signal, the firmware update information carried by the signal including program code implementing a specific light bulb configuration, wherein the plurality of LED light components are characterized in that operating in specific manners specific subsets of the plurality of LED light components allow respective distinct light colors to be generated by the intelligent light bulb, wherein the specific light bulb configuration implemented by the firmware update information is associated with at least one specific distinct subset of the LED light components so that the intelligent light bulb is caused to generate a corresponding specific light color when operated in a specific manner.

20. The method as defined in claim 19, wherein said memory module is responsive to the signal carrying firmware update information received over the wireless communication link from the auxiliary device for:
    (1) drawing energy from said signal to activate the memory component; and
    (2) causing the firmware update process to be performed to modify the instructions of the firmware based on the update information carried by the signal, at least part of said firmware update process being performed while the memory component remains activated using energy drawn from said signal.

21. The method defined in claim 19, wherein the auxiliary device is embodied in an NFC enabled computing device.

22. The method as defined in claim 19, wherein said distinct light colors include at least a first white light associated with a first specific color temperature and a second white light color associated with a second specific color temperature.

23. An intelligent light bulb comprising:
    a) a lighting element comprising multiple light components characterized in that operating in specific manners specific subsets of the light components allows respective distinct light colors to be generated by the light bulb;
    b) a programmable controller in communication with said lighting element, said programmable controller comprising:
        i) a memory module having stored thereon firmware including instructions for controlling operations of the lighting element, said memory module including a passive memory component on which at least a portion of the firmware is stored, the passive memory component of the memory module being configured to be responsive to a signal carrying firmware update information received over a wireless communication link from a device external to the intelligent light bulb for causing a firmware update process to be performed to modify the instructions of the firmware based on the update information carried by the signal;
        ii) a processing unit in communication with said memory module, said processing unit being programmed for operating the lighting element at least in part in accordance with the instructions of the firmware, wherein the instructions of the firmware enable the processing unit to control operations of specific subsets of the light components so that the intelligent light bulb is caused to generate a corresponding specific light color when operated in a specific manner.

24. The intelligent light bulb defined in claim 23, wherein said distinct light colors include at least a first white light associated with a first specific color temperature and a second white light color associated with a second specific color temperature.

25. The intelligent light bulb defined in claim 23, wherein said processing unit is programmed to control the lighting element to achieve a corresponding specific lighting intensity.

26. The intelligent light bulb defined in claim 23, wherein the memory module is configured for communicating with the device external to the intelligent light bulb over a radio frequency (RF) communication link established between the memory module and the device external to the intelligent light bulb.

27. The intelligent light bulb defined in claim 23, further comprising a light bulb body having:
    i) a translucent envelop; and
    ii) a connector for securing the light bulb body to an external electrical socket, the connector including an electrical contact for establishing an electrical connection with a source of electrical power through the external electrical socket,
    wherein the lighting element and the programmable controller are encapsulated within said light bulb body, and wherein in operation light generated by the lighting element shines through the translucent envelop of the light bulb body.

* * * * *